United States Patent [19]

Starr

[11] 4,059,426
[45] Nov. 22, 1977

[54] METHOD AND APPARATUS FOR HEATING GLASS SHEETS WITH RECIRCULATED GAS

[75] Inventor: Eugene W. Starr, Allison Park, Pa.
[73] Assignee: PPG Industries, Inc., Pittsburgh, Pa.
[21] Appl. No.: 728,829
[22] Filed: Oct. 1, 1976
[51] Int. Cl.² .......................................... C03B 29/00
[52] U.S. Cl. ............................ 65/25 A; 65/114; 65/119; 65/182 A; 65/349
[58] Field of Search ............... 65/104, 107, 114, 119, 65/25 A, 182 A, 349, 350, 356

[56] References Cited

U.S. PATENT DOCUMENTS

| | | | |
|---|---|---|---|
| 1,837,311 | 12/1931 | Amsler | 65/119 |
| 3,048,383 | 8/1962 | Champlin | 65/25 A |
| 3,223,501 | 12/1965 | Fredley et al. | 65/25 A |
| 3,332,759 | 7/1967 | McMaster et al. | 65/25 A |
| 3,338,697 | 8/1967 | McMaster et al. | 65/182 A |
| 3,425,818 | 2/1969 | Plumat | 65/182 A |
| 3,551,130 | 12/1970 | McMaster | 65/182 A |
| 3,607,173 | 9/1971 | McMaster et al. | 65/25 A |
| 3,637,362 | 1/1972 | Oelke et al. | 65/25 A |
| 3,754,885 | 8/1973 | Bowman | 65/119 |
| 3,809,542 | 5/1974 | Lythgoe et al. | 65/33 |
| 3,884,667 | 5/1974 | Schraven | 65/119 |

OTHER PUBLICATIONS

"Transvector Air Flow Amplifiers" by Vortec Corp.—4511 Reading Rd., Cincinnati, Ohio, 45229.
"Jet-Flo Transducer," Bulletin UFC-300 by Union Flonctics Corp., P.O. Box H., Imperial, Pa. 15126
"Jet Flow 100 Airmover," Ref 60G (173), by Olin Energy Systems Ltd, North Hylton Road, Sunderland, England.

Primary Examiner—Arthur D. Kellogg
Attorney, Agent, or Firm—Dennis G. Millman

[57] ABSTRACT

In a furnace for heating sheets of glass wherein the glass is supported on a layer of gas, hot furnace gases are internally recirculated by means of an air flow amplifier utilizing the Coanda effect. A portion or all of the thermal energy may be efficiently supplied by electric heating.

11 Claims, 6 Drawing Figures

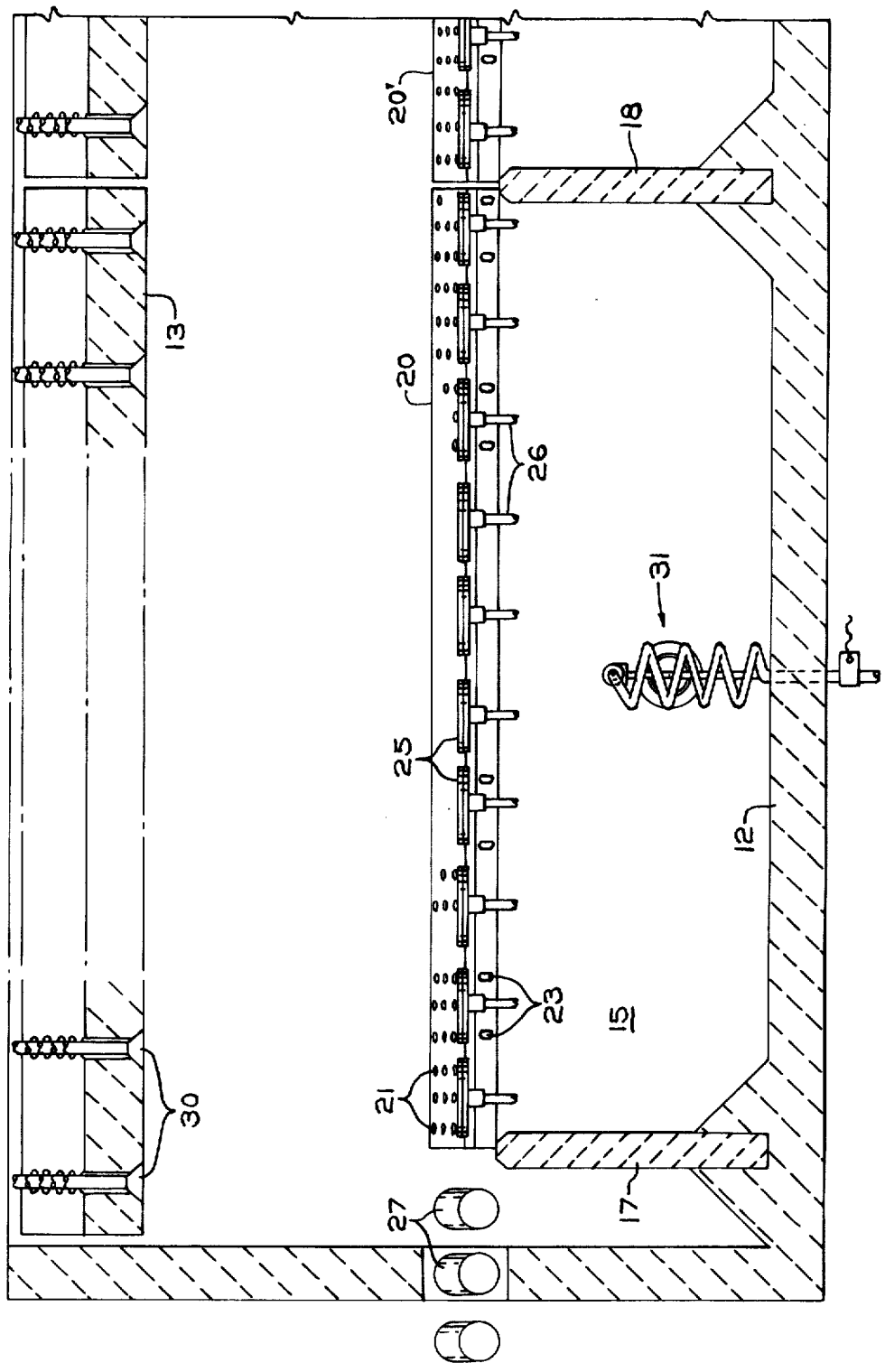

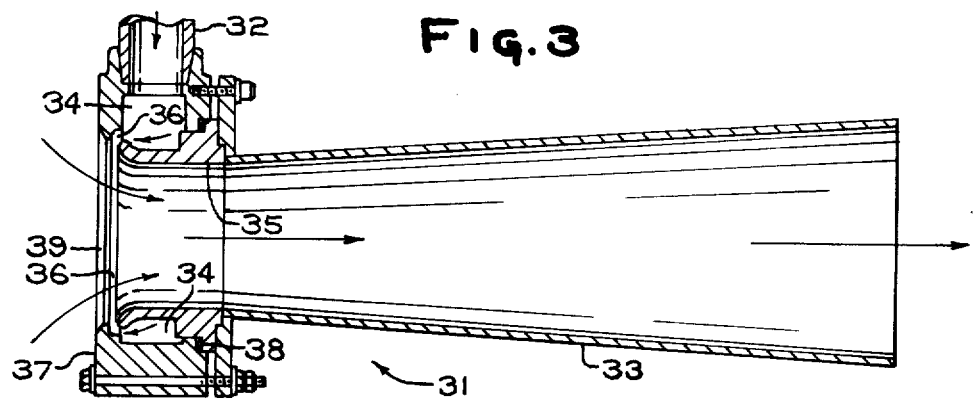
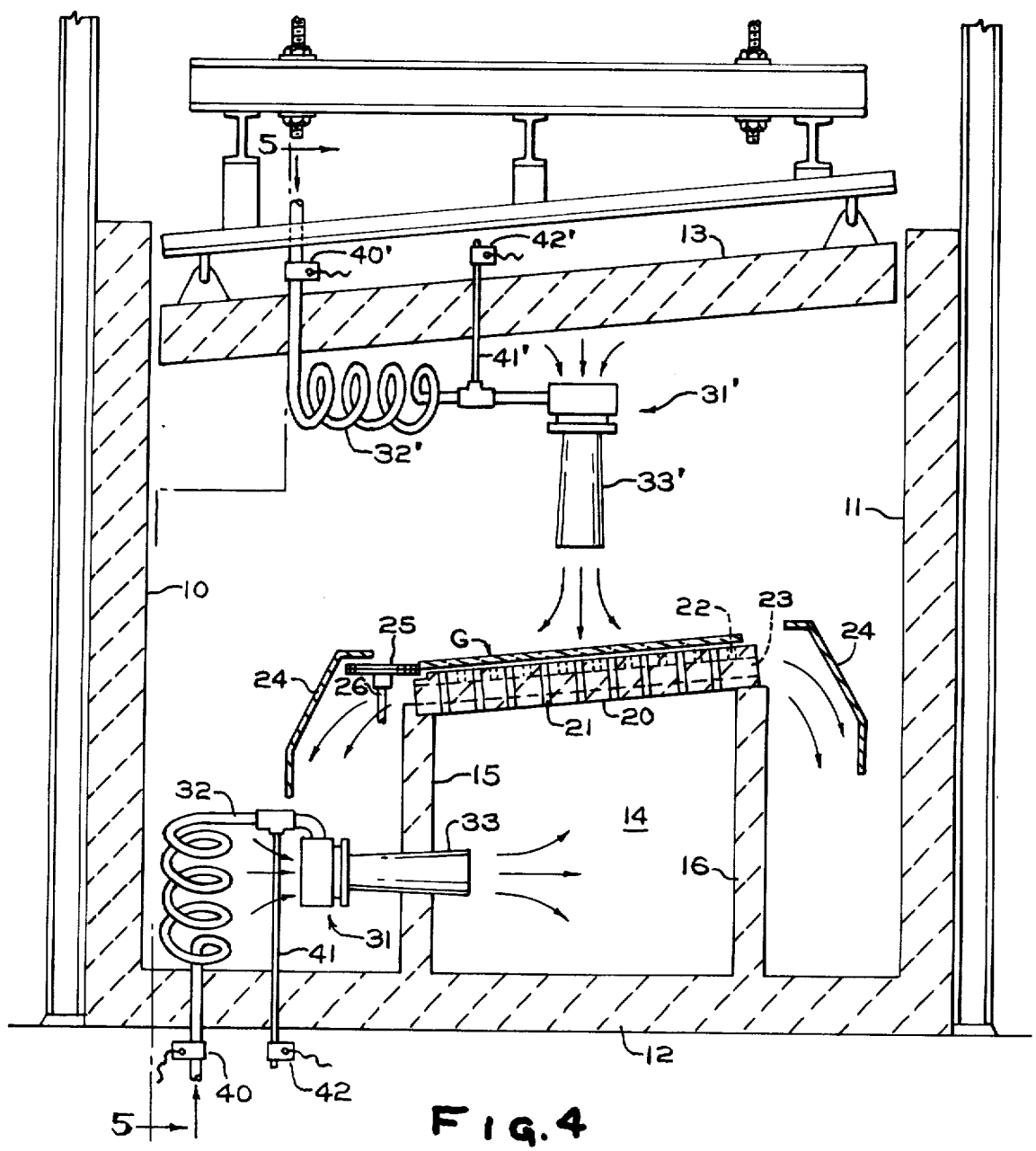

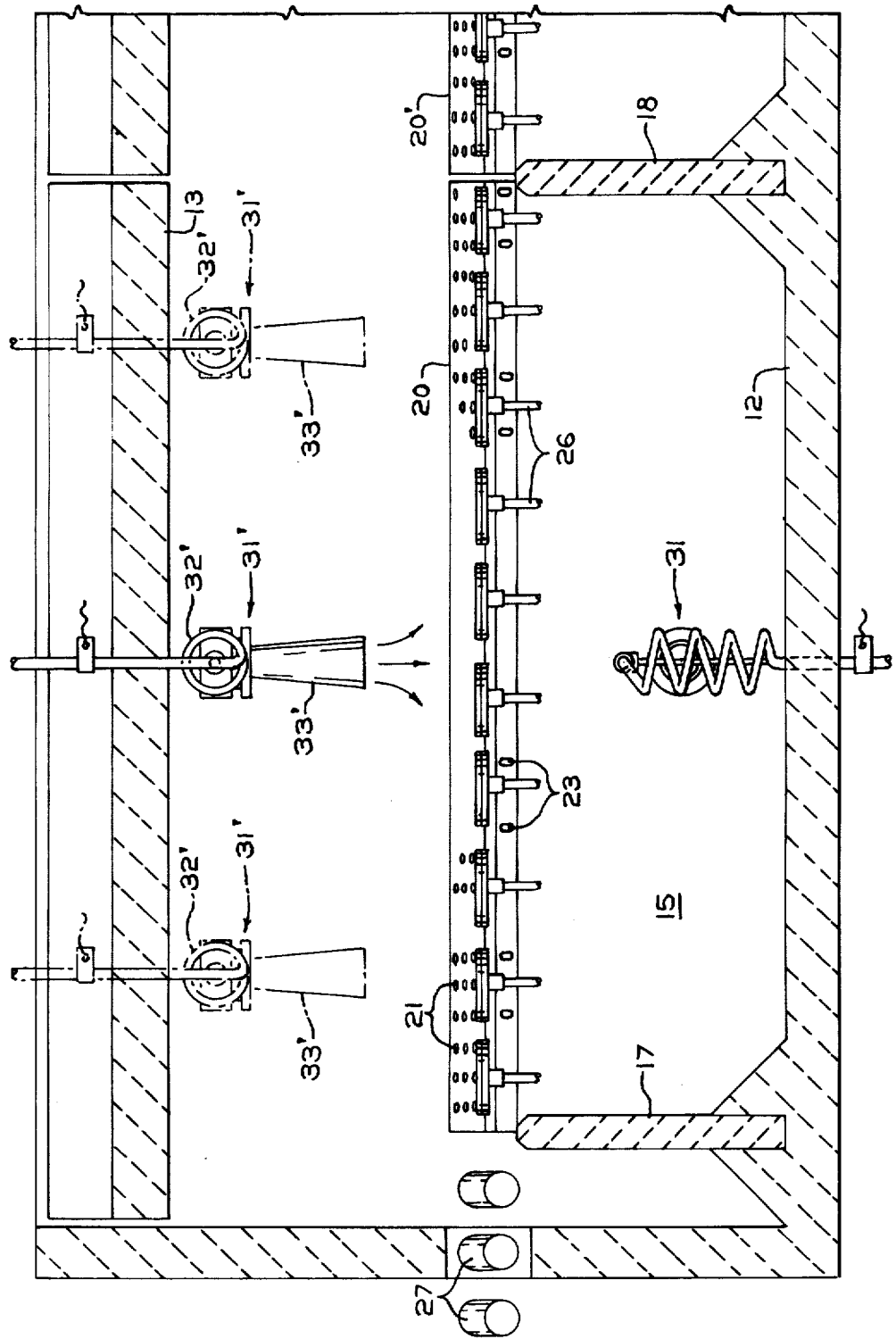

METHOD AND APPARATUS FOR HEATING GLASS SHEETS WITH RECIRCULATED GAS

CROSS-REFERENCE TO RELATED APPLICATION

This application is related in subject matter to U.S. patent application Ser. No. 728,808, filed on even date herewith by E. W. Starr and G. W. Misson, entitled "Electric Glass Sheet Heating Furnace and Method."

BACKGROUND OF THE INVENTION

This invention relates to furnaces for heating glass articles, in particular glass sheets, of the type wherein the glass is subjected to blasts of hot gas and/or supported on a layer of hot gas. Such furnaces are typically employed to heat the glass in preparation for tempering, bending, or other treatment. Examples of gas-support furnaces for heating glass sheets may be seen in U.S. Pat. No. 3,223,501 to Fredley et al. and in U.S. Pat. No. 3,332,759 to McMaster et al.

It is customary with such furnaces to utilize a blower to generate the pressure required to blast the hot gases against the glass, and it is preferred to recirculate the hot gases from the furnace back through the blower in order to conserve energy. But providing such a recirculating blower is usually a problem. If the blower is located within the furnace enclosure itself, it must be made of costly heat resistant materials, but even then the severe operating conditions often lead to excessive wear and frequent maintenance problems. In an attempt to overcome this problem, blowers have been placed outside the furnace, and the hot gases conducted to and from the furnace through conduits. However, this approach does not entirely avoid the problem because operating conditions for the blowers are still quite severe, and withdrawing the gases from the furnace causes disadvantageous heat losses. Moreover, the energy consumption of such a blower is relatively heavy regardless of location, and thus it would be desirable to provide pressurized air to a glass treating furnace by more efficient means.

One alternative to the use of a blower is disclosed in U.S. Pat. No. 3,607,173 to McMaster et al. An external source of compressed air is used to draw furnace gases into a plurality of venturi devices termed "inspirators." While that arrangement eliminates the need for a hot gas blower, it is apparent that it represents very little, if any, economy in energy usage since the large number of inspirators shown would require a large amount of compressed air, which in turn would entail the use of a large compressor. Also, it could be difficult with such an arrangement to assure adequate heating of the incoming compressed air without harmfully detracting from the amount of heat imparted to the top surface of the glass. This is because providing sufficient heat transfer area for the large number of compressed air lines in front of the gas burners could obstruct the transfer of heat onto the top surface of the glass.

Glass heating furnaces of the gas-support type usually employ the combustion of gaseous fuels, usually natural gas, as their energy source. In view of recent shortages and occasional, localized curtailment of natural gas supplies, as well as the rising costs of gaseous fuels, it would be desirable to provide this type of furnace with the capability of using electrical energy as its heat source, but to do so has heretofore been considered too inefficient.

SUMMARY OF THE INVENTION

The present invention employs an "air flow amplifier," sometimes called an "air mover," which utilizes the Coanda effect to induce a recirculating flow of hot gases within a glass heating furnace of the type wherein sheets of glass are supported on a layer of hot gases. In the air flow amplifier, a small amount of outside air pressurized to a relatively small degree is made to entrain much larger volumes of hot furnace gases in a rapidly moving stream which is fed to the plenum of a porous gas support bed. A single air flow amplifier, together with a small compressor outside the furnace, can replace a large trouble-prone blower in recirculating pressurized, hot furnace gases to an entire section of the support bed. The air flow amplifier has no moving parts and can readily be made of high temperature resistant materials. Therefore, the amplifier can be located wholly within the furnace with no maintenance difficulties, and the recirculated gases never have to leave the furnace, thereby conserving energy. Additional energy economies flow from the fact that the small amount of outside air used to operate the air flow amplifier requires relatively little energy to be preheated to furnace temperatures.

It has also been found that the use of air flow amplifiers as the gas impelling means enables this type of furnace to employ all-electric heating with a high degree of efficiency. In the case of all-electric heating, a second air flow amplifier replaces the usual gas burners and serves to direct hot gases at the upper surface of the glass sheet being heated in the furnace. Electric heating applied to the incoming compressed air provides thermal energy for the furnace. It is particularly advantageous to carry out the electric heating within the furnace by resistance heating of the compressed air supply tubes themselves.

THE DRAWINGS

FIG. 2 is a longitudinal cross-sectional view of the furnace of FIG. 1 taken along line 2—2 in FIG. 1.

FIG. 3 is an enlarged cross-sectional view along the axis of an air flow amplifier.

FIG. 4 is a transverse cross-sectional view of an electrically heated glass sheet heating furnace employing air flow amplifiers to heat both top and bottom surfaces of the glass in accordance with another embodiment of the present invention.

FIG. 5 is a longitudinal cross-sectional view of the furnace of FIG. 4 taken along line 5—5 of FIG. 4.

DETAILED DESCRIPTION

Figure 1:
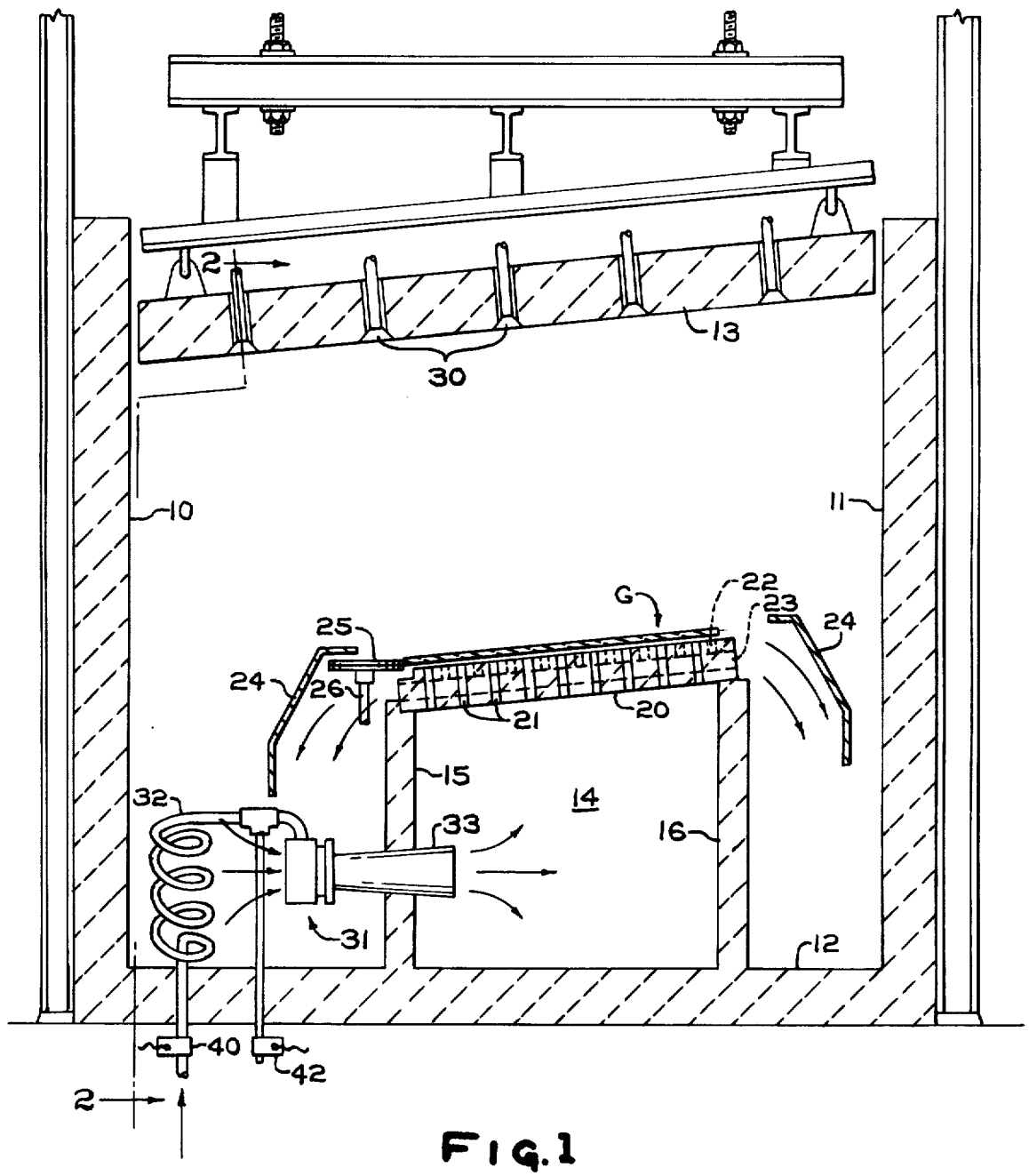
FIG. 1 is a transverse cross-sectional view of a gas-fired glass sheet heating furnace employing an air flow amplifier in accordance with one embodiment of the present invention to provide pressurized gas for supporting the glass sheets.

In FIGS. 1 and 2 there is shown schematically one zone of a typical tunnel-type furnace for heating glass sheets as they are continuously conveyed therethrough. The furnace consists generally of refractory walls 10, 11, and 12, and roof 13. A plenum chamber 14 is defined by refractory slabs 15, 16, 17, and 18 and hearth block 20, the latter having a large number of gas passages 21 bored therethrough to form a gas support bed for the glass. Hearth block 20 also includes a large number of exhaust holes 22 communicating with a plurality of cross-bores 23. The rows of gas passages 21 and the cross-bores 23 are shown in the drawings as lying parallel to the plane of the page for the sake of simplicity, but is is usually preferred that they extend across the block at an angle slightly oblique to the direction of glass travel. Pressurized gas is forced upward through passages 21 to heat the underside of a sheet of glass G and to support the glass on a layer of gas. The gas escapes from the space between the hearth block 20 and the glass through the exhaust holes 22 and returns to the main furnace enclosure by way of cross-bores 23. Other forms of gas support beds as are known in the art may be employed as well. Optional baffles 24 help equalize conditions throughout the furnace. The hearth block is tilted at a slight angle from horizontal to cause the lower edge of the glass sheet to bear against drive wheels 25. Each drive wheel is mounted on a shaft 26 which extends out of the furnace where it is associated with drive means (not shown) for rotating the shaft and the wheel. The glass sheets are brought into the furnace on rolls 27 and, as viewed in FIG. 2, propelled from left to right by the drive wheels 25 across hearth block 20 and onto the hearth block 20' of the next furnace zone, if any. Further details of the overall construction and operation of this type of furnace are not necessary for an understanding of this invention. Moreover, such details are well known to those in the art as evidenced by a large numbr of U.S. Patents, such as the aforementioned U.S. Pat. Nos. 3,223,501 and 3,332,759, the disclosures of which are hereby incorporated by reference.

In the embodiment shown in FIGS. 1 and 2, the primary source of energy in the furnace is the conventional combustion of gaseous fuels by means of a plurality of roof burners 30. The hot gases being circulated in the furnace therefore include air and gaseous products of combustion. The embodiment deviates from prior practice in the use of an air flow amplifier 31 to recirculate the hot gases within the furnace and to pressurize plenum 14. Compressed air is supplied to the air flow amplifier by tube 32, and the amplified gas flow is discharged through flared tube 33. The air flow amplifier and the tube 32 should be made of a material able to withstand high temperatures such as a high temperature-resistant stainless steel.

As used herein, the term "air flow amplifier" is intended to mean any device which utilizes the Coanda effect to make a small fluid stream induce a much larger fluid flow. The Coanda effect, a well-known principle of fluid dynamics, is the tendency of a fluid coming out of a jet to closely follow the contour of an adjacent wall rather than follow a straight line. How this is put to use in an air flow amplifier may be illustrated by referring to the cross-sectional view of amplifier 31 shown in FIG. 3. The fluid stream that provides the motivating force, which may be termed the "primary gas" (usually compressed air), flows from inlet tube 32 into an annular manifold 34 around the outside of a cylindrical throat member 35. The air is then throttled through an annular gap 36 between a curved lip portion of throat 35 and outer annular manifold housing 37. The width of gap 36 is determined by the thickness of a gasket 38. Air passing through gap 36 attains a very high velocity which, for typical input pressures, may be on the order of sonic velocity. This thin, high velocity, annular stream of air closely follows the curved interior surface of throat 35 in accordance with the Coanda effect, and in so doing, imparts a powerful entrainment force on any gases within the amplifier. As a result, large volumes of gas (the "secondary gas") are drawn into a suction opening 39 and discharged at a high velocity through flared tube 33. Ambient gases in the vicinity of the discharge opening of the flared tube 33 will also tend to become entrained in the induced flow.

The degree of amplification achieved by such an arrangement is influenced by the pressure of the compressed air input, the width of gap 36, the back-pressure against which the output stream must work, and the design of the particular amplifier used. An airflow amplifier of the type shown in FIG. 3 generally operates effectively at input pressures (measured at the manifold 34) from about 0.5 psig (4000 Pa) to about 60 psig (400,000 Pa) and with a gap width of about 0.003 inch (0.08 millimeters) to about 0.115 inch (3 millimeters). With discharge into free air, the amplification ratio of secondary air volume flow rate to primary air volume rate can typically be on the order of 10:1 to 20:1 or even higher. If the additional entrainment of surrounding gas at the exit end of the flared tube is taken into account, the overall amplification ratio can be as high as 35:1 to 40:1. When the amplifier is discharging into a pressurized plenum as shown in FIG. 1, the amplification ratio will be somewhat lower than if it were discharging into free air, but the moderate back-pressure typically encountered in this type of furnace does not preclude a highly efficient and effective amplification.

Specific dimensions and operating parameters for an air flow amplifier used in accordance with this invention depend upon the total gas flow requirement for the furnace zone involved, which in turn is largely determined by the particular structural design of the furnace. However, the following illustrative example may be useful as a general guideline. In a conventional glass heating furnace having the general configuration shown in the figures, a plenum pressure of no more than about 4 ounces per square inch (1700 Pa) is commonly found to be adequate for supporting and heating glass sheets of about ⅛ inch (3 millimeters) to ¼ inch (6 millimeters) in thickness. To maintain such a plenum pressure in one furnace zone 34 inches (86 centimeters) wide and 100 inches (254 centimeters) long, a single air flow amplifier with a 4 inch (10 centimeter) throat diameter may suffice if provided with a compressed air input of about 140 standard cubic feet per minute (4 cubic meters per minute) at a pressure (measured at the manifold 34) of about 5 psi (34,500 Pa) to 20 psi (138,000 Pa). A suitable air flow amplifier is the "Jet-Flo Transducer AGV-100" sold by Union Flonetics Corp., Imperial, Pennsylvania.

The continual feeding of compressed air into the furnace may cause pressurization of those enclosures which are fairly airtight, but leakage from many furnaces may often avoid any substantial pressurization. If desired, a vent may be provided through the furnace wall to relieve any excess pressure.

Because the gases directed at the underside of the glass must heat the glass as well as support it, it is preferred that the output from the air flow amplifier not be cooled by the mixing of unheated compressed air with the recycled furnace gases; it would be even more desirable in some cases if the thermal energy of the recycled gases could even be enhanced. Accordingly the specific embodiments shown include means for heating the compressed air stream to a temperature preferably at least as great as the average furnace temperature. This heating could be accomplished simply by heat transfer from the hot environment of the furnace itself, but it has been found to be considerably more efficient to heat the air line 32 directly by electrical resistance heating in the tube itself. Electrical contact is made with the compressed air tube 32 by means of a clamp 40 and dummy rod or pipe 41 which is connected at one end to tube 32 and to an electrical lead clamp 42 at its other end, thereby establishing a closed circuit between two spaced points along tube 32. Tube 32 will usually require extra length within the furnace, such as the helix shown, to provide sufficient residence time for the compressed air to attain high temperature. The length can be shortened by including turbulent flow inducing means, such as a twisted stainless steel strap, inside the heated tube. With this arrangement, air passing through the pipe can be quickly heated to furnace temperatures without the limiting factor of heat transfer through the pipe wall. At the same time, thermal energy is not being withdrawn from the furnace, but is being added to it by heat transfer from the outside surface of the electric resistance tube heater. As a result, the compressed air can be heated without detracting from the transfer of heat to the glass.

The amount of electrical power required is largely dependent on the desired plenum temperature and the flow rate of the compressed air. The length of the tube heater should be established in conjunction with the power requirement so as to avoid overheating a too short tube. As an example, it has been found satisfactory to apply approximately 0.5 to 2 kilowatts A.C. for every standard cubic foot per minute (17 to 71 kilowatts for every standard cubic meter per minute) of compressed air flowing along about a 20 foot (6 meter) length of ½ inch (1.27 centimeters) outside diameter 309 stainless steel tube having 1/16 inch (1.6 millimeters) wall thickness. These power levels produced a tube temperature (measured at the outside surface of the tube 32) ranging from about 1250° F. (675° C.) to about 1650° F. (900° C.) and a plenum temperature a few degrees lower than the tube temperature.

Figure 6:
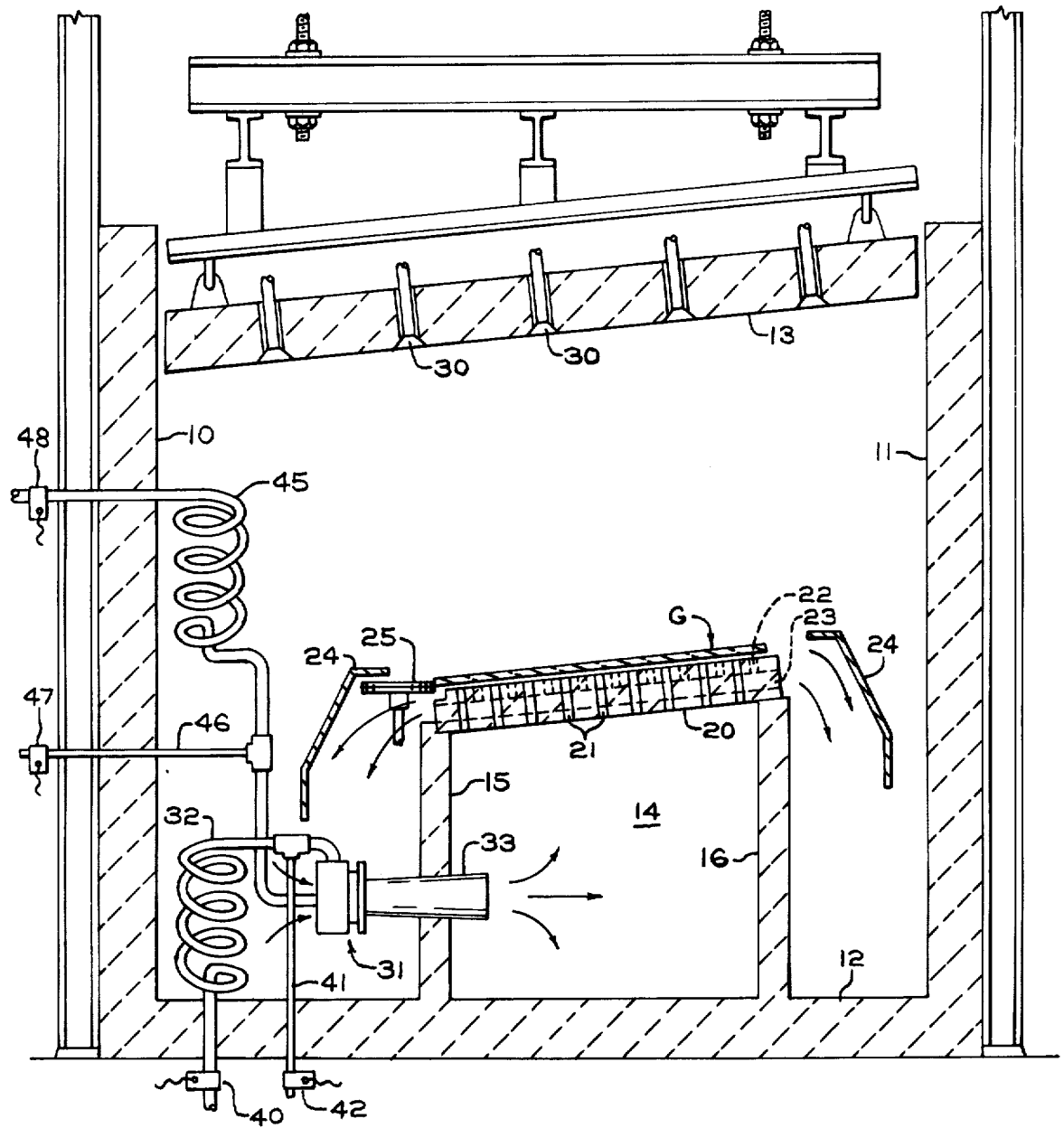
FIG. 6 is a transverse cross-sectional view of a variation of the FIG. 1 embodiment, wherein an auxiliary air heating tube is employed.

An alternate embodiment which enables the plenum temperature to be boosted is shown in FIG. 6. There, an auxiliary air tube 45 discharges heated air into the throat of air flow amplifier 31. Air passing through tube 45 is heated by electrical resistance through the tube, with an electrical circuit being established by rod 46 and electrical connectors 47 and 48. By this arrangement, the air being sucked into the air flow amplifier can be heated to an average temperature higher than that of the ambient furnace gas.

FIGS. 4 and 5 depict yet another embodiment of the invention, which is identical to the arrangement shown in FIGS. 1 and 2 except that the roof burners 30 have been replaced by one or more upper air flow amplifiers 31', thereby making the furnace all-electric. The upper air flow amplifiers 31' may be identical to the bottom amplifier 31 and operate in the same manner to recirculate hot furnace gases and direct them onto the upper surface of the glass. Operating parameters may be generally the same as for the bottom amplifier, but since the upper amplifiers experience virtually no back-pressure and are not used to support the glass, their amplification ratio would be expected to be slightly higher. The number of upper air flow amplifiers depends upon the speed with which it is desired to heat the glass. One upper amplifier in each zone of a furnace would produce the desired result, but as shown in phantom lines in FIG. 5, several amplifiers spaced along the length of a furnace zone would produce a more practical rate of heating. In the embodiment of FIGS. 4 and 5, thermal energy is supplied to the furnace solely by electrical resistance heating through compressed air tubes 32 and 32'. Thus the electrical power requirement for the tube heaters will be determined by the amount of energy required to maintain the furnace at the desired temperature. It would, of course, be possible to use auxiliary heat sources (either electrical or fuel-burning). Auxiliary heaters may be desirable in particular during start-up to aid in quickly bringing the furnace up to the operating temperature.

Other variations and modifications may be resorted to within the scope of the present invention as defined by the following claims.

I claim:

1. A furnace for heating a sheet of glass while supporting on a layer of gas comprising:

an enclosure, means to heat said enclosure, a glass support bed within said enclosure having gas passages therethrough, an enclosed plenum chamber in communication with said gas passages, means for pressurizing said plenum chamber including an air flow amplifier having a conduit-like configuration with an inlet throat at one end in communication with ambient gas in said enclosure and an outlet opening at the opposite end in communication with said plenum chamber, a compressed gas tube connected at one end to a side inlet of said air flow amplifier and at the other end to a source of compressed gas outside of said enclosure, and a narrow, peripherally extending opening adjacent to the inside surface of said inlet throat communicating with the compressed gas inlet and adapted to direct a high velocity stream of gas along the interior surface of said inlet throat, whereby ambient gases in said enclosure are drawn into said plenum and forced through said passages in said support bed with sufficient pressure to establish gas support for a sheet of glass overlying said bed.

2. The furnace of claim 1 wherein at least a portion of the compressed gas tube within the enclosure forms part of an electrical resistance heating circuit so as to heat compressed gas being fed to the air flow amplifier as well as ambient gases within the enclosure.

3. The furnace of claim 2, wherein said heating means comprises combustion heating means.

4. The furnace of claim 2 further including a second air flow amplifier, supported in an upper portion of said enclosure, having its outlet opening directed toward the upper side of said support bed and its inlet throat in communication with said enclosure, and a compressed gas tube connected at one end to a side inlet of said amplifier and at the other end to a source of compressed gas outside said enclosure.

5. The furnace of claim 2, further including an electrically heated tube leading from a source of compressed gas outside said enclosure into said enclosure and terminating in an outlet located closely adjacent to the inlet throat of the air flow amplifier.

6. A method of heating a sheet of glass while supporting on a layer of gas comprising transporting a sheet of glass into an enclosure and into a position overlying a support bed having gas passages communicating with a plenum chamber therebelow, heating the gases within the enclosure, establishing an annular flow from a source of compressed gas in a Coanda effect air flow amplifier within the enclosure thereby drawing heated ambient gas from the enclosure into the air flow amplifier and discharging the gas into the plenum chamber so as to pressurize the plenum chamber and force gas through the support bed passages with sufficient pressure to support the sheet of glass on the gas.

7. The method of claim 6 wherein the compressed gas is heated prior to its delivery to the air flow amplifier.

8. The method of claim 7 wherein the heating is carried out within the enclosure by passing electric current through a tube carrying the compressed gas.

9. The method of claim 8 wherein the gas within the enclosure is heated by combustion heating means.

10. The method of claim 8 wherein compressed gas is also fed to a second Coanda effect air flow amplifier in an upper portion of the enclosure to thereby draw ambient gas from the enclosure and discharge the gas onto the upper surface of the glass sheet.

11. The method of claim 6 wherein the temperature of the gas being drawn into the air flow amplifier is increased by heating an auxiliary stream of gas passing through a tube within the enclosure by electric resistance heating of the tube and discharging the heated auxiliary stream near the air flow amplifier so as to be drawn into the air flow amplifier.

* * * * *